(No Model.)
M. W. TUCKER.
Draft Equalizer.
No. 236,196. Patented Jan. 4, 1881.
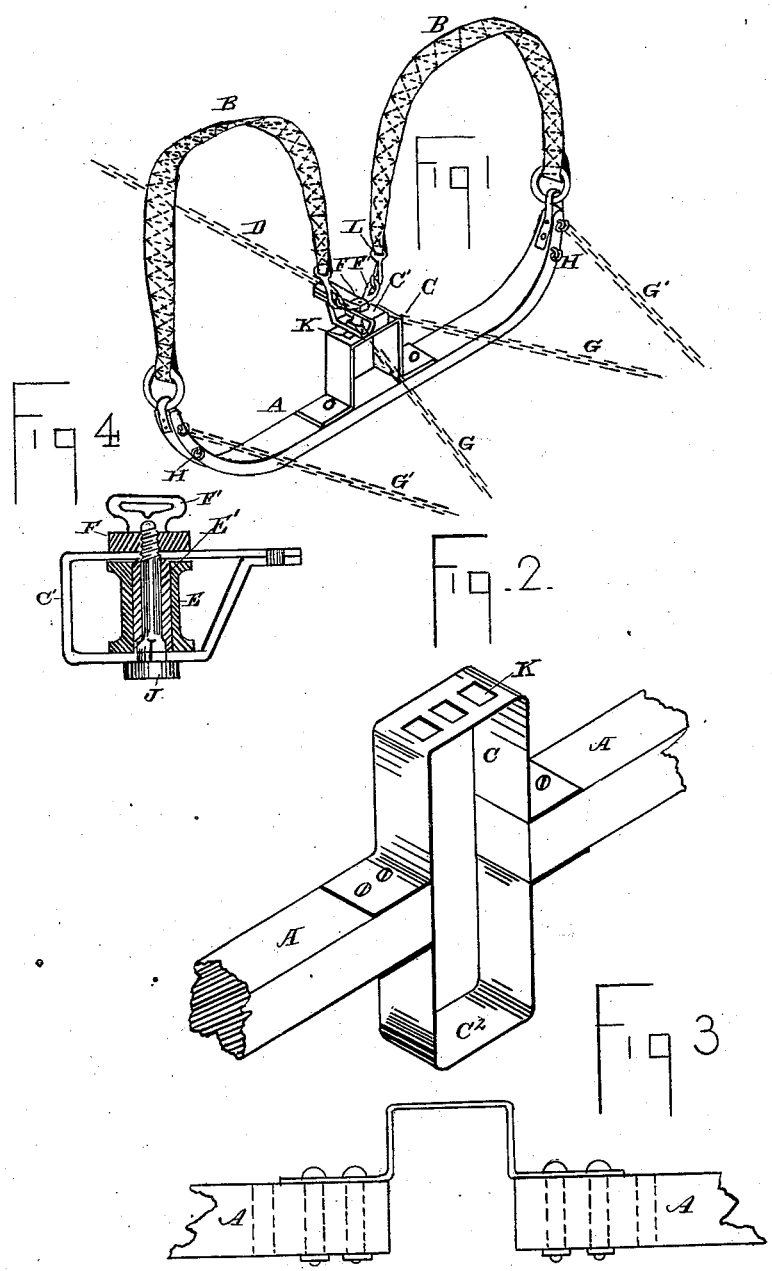
WITNESSES
Samuel E. Thomas
A W Bright
INVENTOR.
Morris W. Tucker
By Wells W. Leggett
Attys.

UNITED STATES PATENT OFFICE.

MORRIS W. TUCKER, OF SUMNER, MICHIGAN.

DRAFT-EQUALIZER.

SPECIFICATION forming part of Letters Patent No. 236,196, dated January 4, 1881.

Application filed July 13, 1880. (No model.)

*To all whom it may concern:*

Be it known that I, MORRIS W. TUCKER, of Sumner, county of Gratiot, State of Michigan, have invented a new and useful Improvement in Draft-Equalizers; and I declare the following to be a full, clear, and exact description of the same, such as will enable others skilled in the art to which it pertains to make and use it, reference being had to the accompanying drawings, which form a part of this specification.

My invention consists in the combination of the devices and appliances hereinafter set forth and claimed.

In the drawings, Figure 1 is a perspective view of a draft-equalizer embodying my invention, in which the draft-bar is made continuous from end to end. Fig. 2 is a variation in which the bar is screwed at the middle point and the parts united by two metallic arches, forming a passage for the pole; Fig. 3, another variation in which the bar is screwed and the separate pieces made adjustable, so as to give to either horse any desired advantage of the draft; Fig. 4, a separate view of the draft-block.

A is the draft-bar, curved upward at its extremities, so as to bring the line of draft of the traces at the proper elevation.

B represents straps, which pass over the backs of the horses and support the draft-block.

C is a metallic arch at the center, supporting a draft-block or clevis, C', at its crown, from which the draft-chain D passes back to the vehicle. Within the draft-block C' is a loose pulley, E, which is preferably journaled upon a thimble, E', which thimble forms a bearing as the nut F is run down, so as to prevent any binding of the pulley between the upper and lower bars of the draft-block C'.

G is the equalizing-chain. It starts from the hames of one of the horses, thence back around the pulley E, and then forward, and is attached to the hame of the other horse. Chains G' pass respectively from the ends of the draft-bar A to the hames of the adjacent horses.

The operation of the device is as follows: The draft-bar is adjusted beneath the horses just back of the fore legs. The straps B are then passed over the horses' backs and secured in place, as shown. The chains G and G' are properly fastened to the hames, and the draft-chain D is fastened to the vehicle. It will be observed that the pulley, the draft-chain, and the chains G and G' are all practically on the same level, and consequently there is no tendency to rock the draft-bar over out of its proper perpendicular plane. When adjusted as described, it is apparent that the horses must draw equally upon the load, for the chain G will, by yielding around the pulley, cause the draft to be equally distributed between the two horses, no matter which horse may have the lead.

The draft-block C' may be adjusted to the right or left upon the crown of the arch C, so as to give to either horse a slight advantage, if desired. So, also, if it is desired to bring the line of the draft lower down, the draft-block C', with its pulley, may be located on the under side of the arch, and extra rings H should be provided on the same level for the chains G' and the traces.

Instead of making the draft-bar A in a single piece, it may be divided at the middle portion, and the parts may each be made adjustable, so as to give either horse any desired advantage. So, also, for sleighs and other like vehicles, in which the pole is usually low, there may, as in Fig. 2, be an arch above, and another, C², below, the draft-bar, so as to allow of the free passage of the pole.

In order that the bolt J may not work loose, I prefer generally to employ a bolt with a square neck setting through one of the square openings K, then providing the nut F with ears F', to which the straps B may be attached, thereby preventing the nut from working off from the bolt. I would make the attachment of the straps usually by snap-hooks L, and the straps B may, if desired, be provided with a buckle for lengthening or shortening them.

What I claim is—

1. In a draft-equalizer, the combination, with a draft-bar provided with an arch and a clevis having a pulley fitted therein, of a bolt-and-slot fastening device adapted to secure the clevis in lateral adjustment to the arch, the chain which passes between the horses being passed about said pulley, and the wagon-chain being attached to the stem of the clevis, substantially as set forth.

2. In a draft-equalizer, the combination, with a draft-bar having upturned extremities provided with upper and lower chain-fastening devices, of a central upright arch formed on the draft-bar and a clevis having a pulley fitted therein, said clevis being adapted to be secured to the upper or lower side of the arch-crown, substantially as set forth.

3. In combination with the clevis C' and the arch C, the pulley E and thimble E', together with the swivel bolt and nut, substantially as described.

4. The bolt J, with the square neck, in combination with the square openings K and nut F, the nut provided with ears F', substantially as described.

5. In a draft-equalizer, the combination, with a two-part draft-bar, of an arch uniting the two parts and adapted to be secured to them at different points in their length, whereby said parts may be adjusted to or from the arch, substantially as set forth.

6. In a draft-equalizer, the combination, with a two-part draft-bar, of an upright arch and a depending arch, respectively uniting said two parts of the draft-bar, substantially as set forth.

In testimony whereof I sign this specification in the presence of two witnesses.

MORRIS W. TUCKER.

Witnesses:
HENRY NORTON,
J. B. TUCKER.